Nov. 10, 1925.
F. E. HUMMEL ET AL
BREAD TOASTER
Filed Feb. 4, 1924
1,560,578
5 Sheets-Sheet 1
Fig. 1.
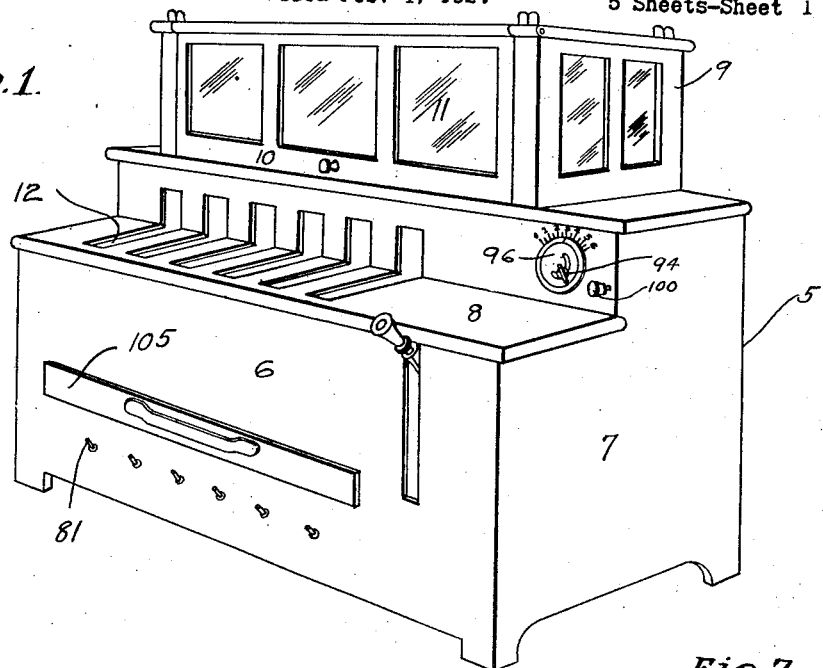
Fig. 2.
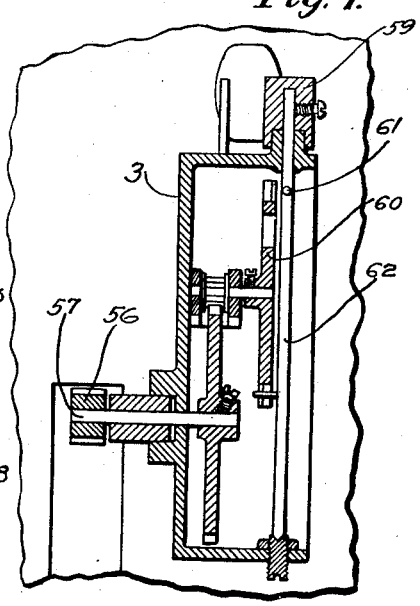
Fig. 7.
Inventors.
F. E. Hummel.
J. J. Noeth.
Milo B. Stevens Co,
Attorney

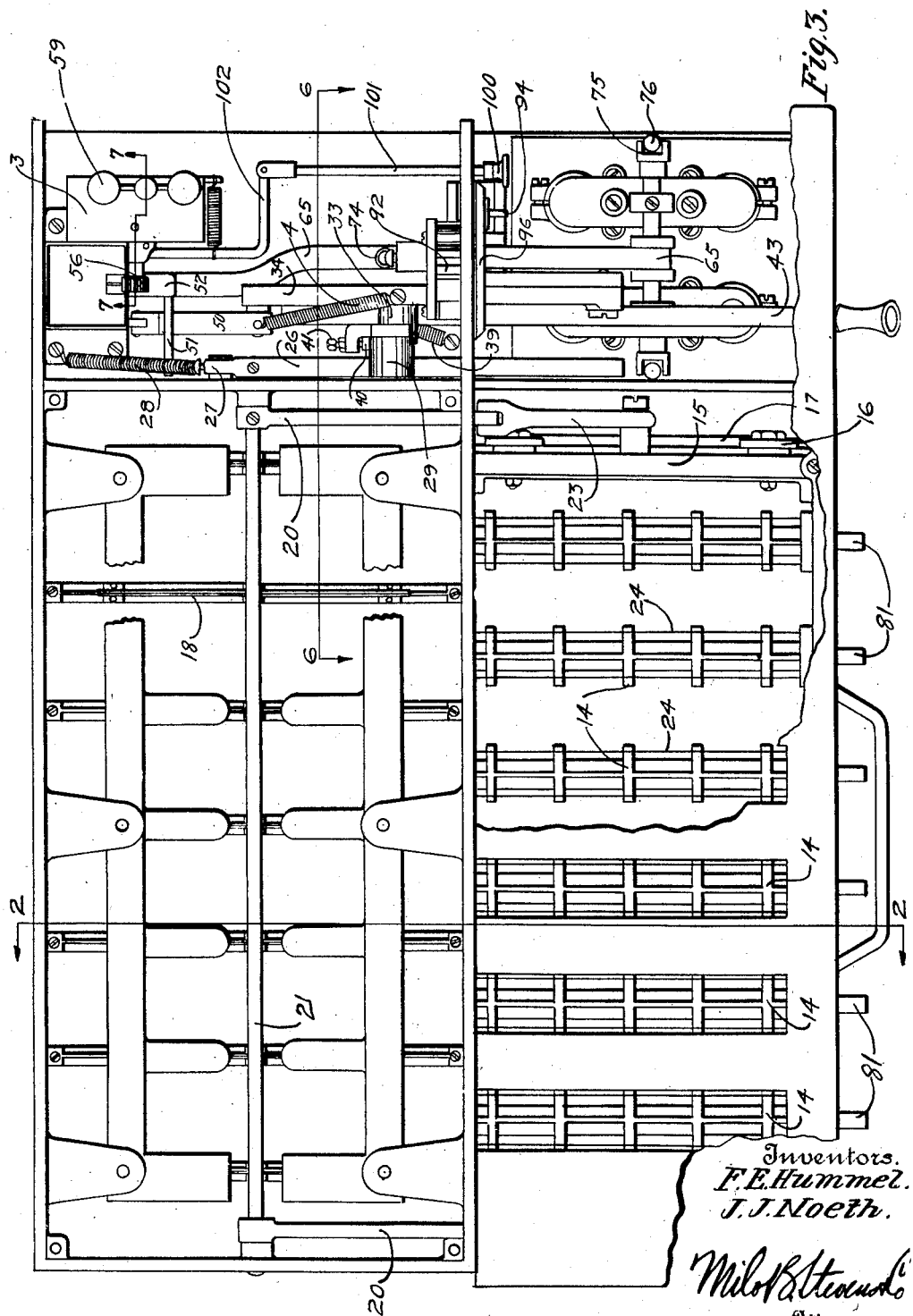

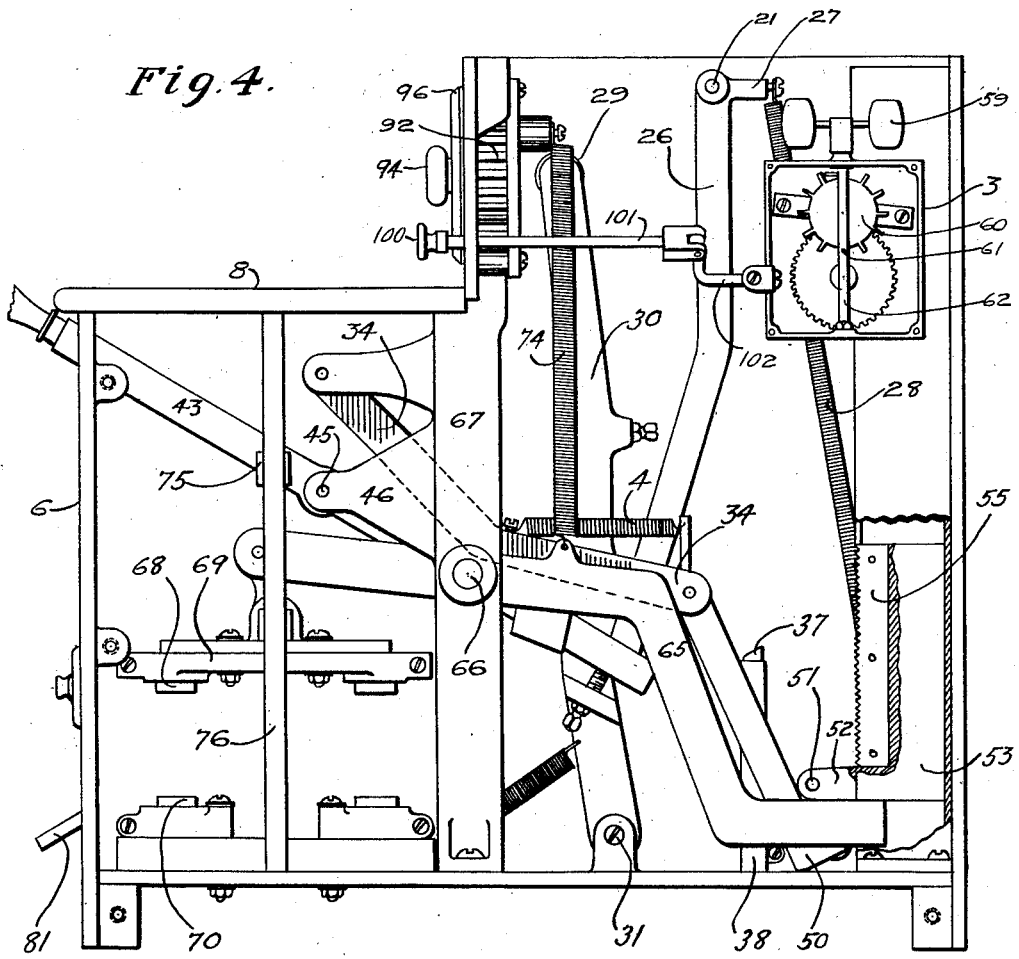

Nov. 10 1925.                                                                                         1,560,578
F. E. HUMMEL ET AL
BREAD TOASTER
Filed Feb. 4, 1924                                                        5 Sheets-Sheet 4

Inventors
F. E. Hummel
J. J. Noeth
Milo B. Stevens & Co.
Attorneys

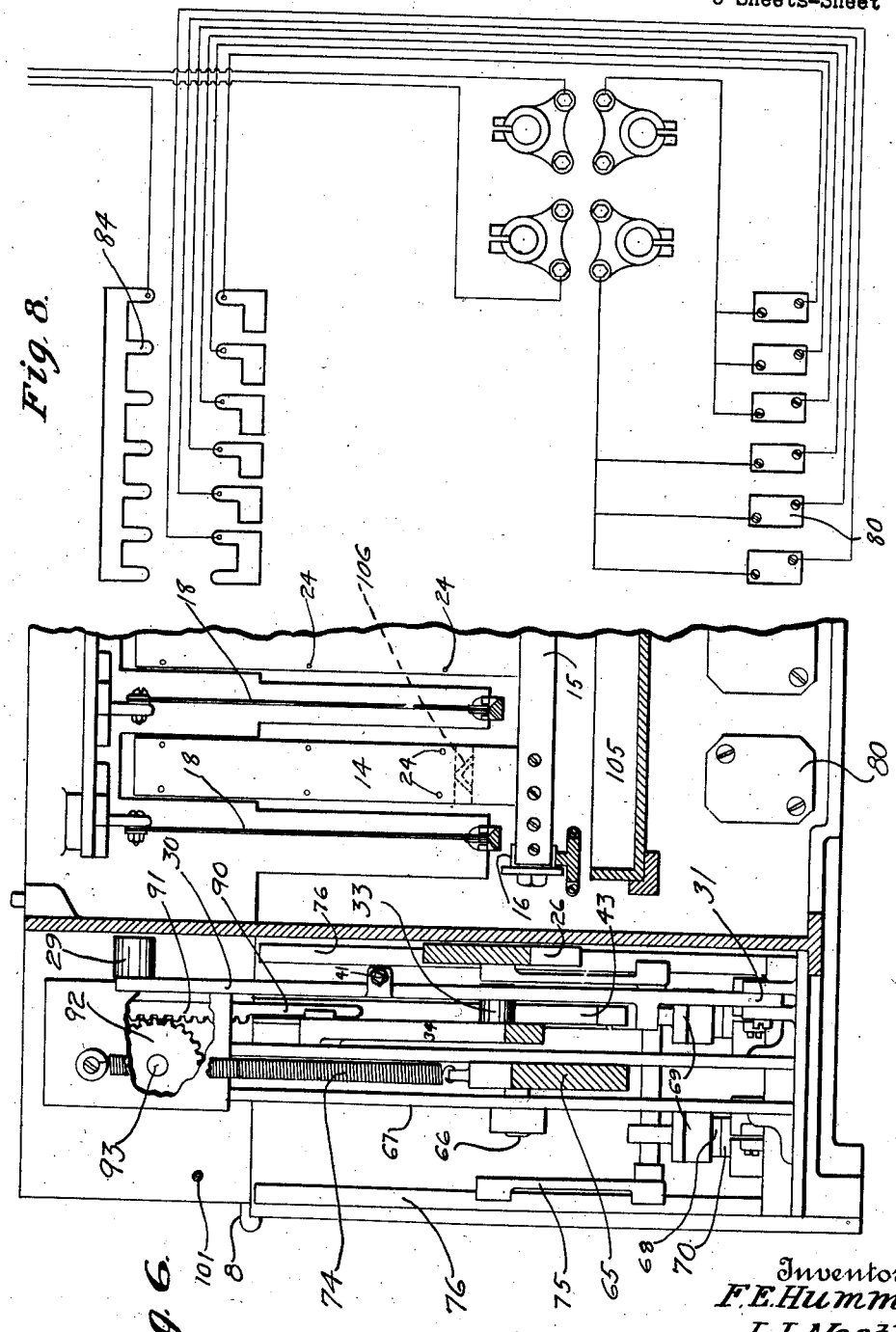

Patented Nov. 10, 1925.

1,560,578

UNITED STATES PATENT OFFICE.

FREDERICK E. HUMMEL AND JOHN J. NOETH, OF CHICAGO, ILLINOIS.

BREAD TOASTER.

Application filed February 4, 1924. Serial No. 690,580.

*To all whom it may concern:*

Be it known that we, FREDERICK E. HUMMEL and JOHN J. NOETH, citizens of the United States, residing at Chicago, in the county of Cook and State of Illinois, have invented new and useful Improvements in Bread Toasters, of which the following is a specification.

This invention relates to toasting devices especially adapted for restaurant use.

Briefly stated, an important object of this invention is to provide an electric toaster having simple means whereby a plurality of slices of bread may be advanced to positions between a number of heating elements and automatically moved to discharge position at the end of a predetermined period.

A further object is to provide a toaster of the character specified wherein the heating elements are energized at practically the same time the bread is moved to heating position and are deenergized upon the completion of the toasting period.

A further object is to provide a toaster of the character specified in which the handling area or zone is remote from the toasting zone or area so that the operator is not likely to be burned.

A further object is to provide simple means entirely within the control of the operator for regulating the toasting period.

A further object is to provide a toaster which is neat in appearance, of highly simplified construction, and cheap to manufacture.

Other objects and advantages will be apparent during the course of the following description.

Figure 5:
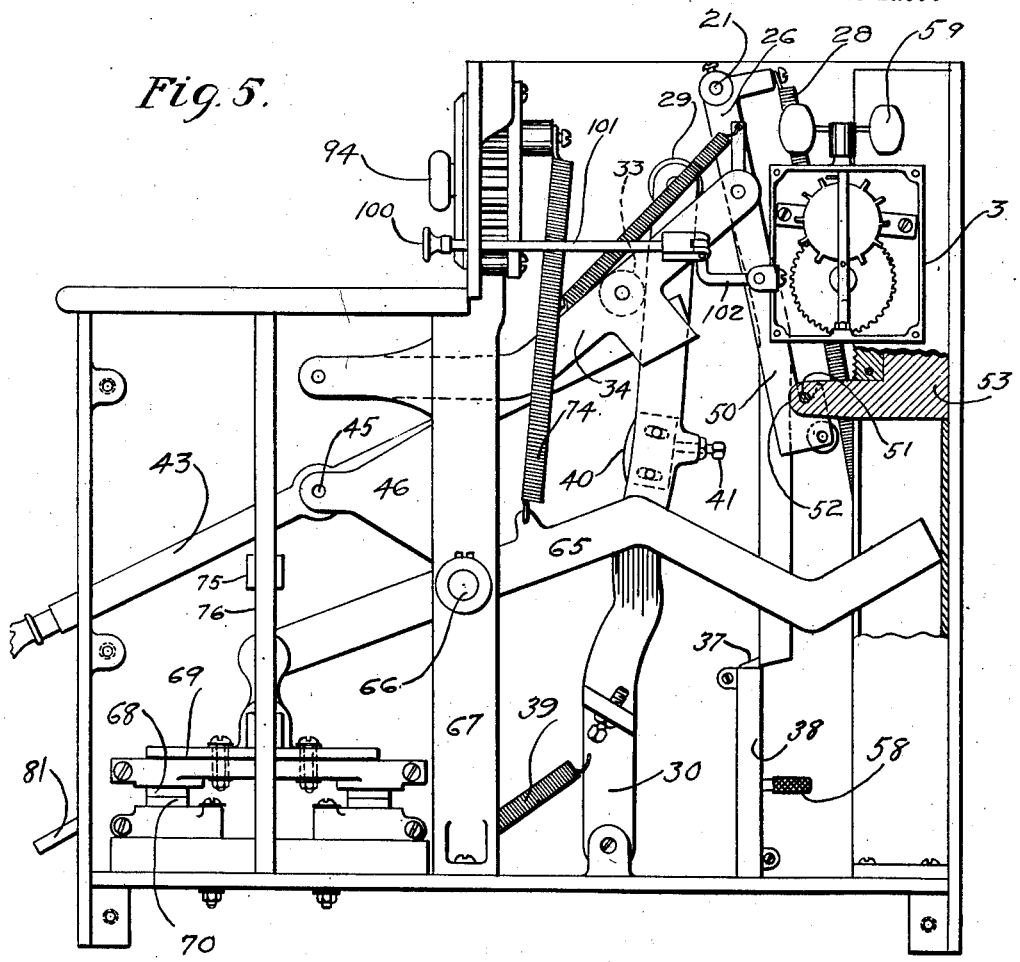
Figure 9:
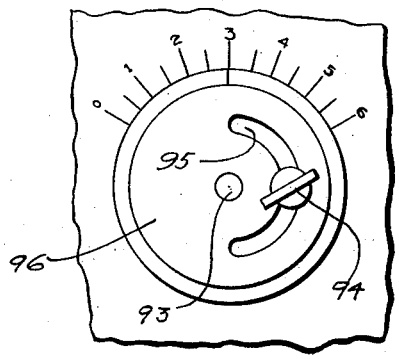

In the accompanying drawings forming a part of this application and in which like numerals are employed to designate like parts throughout the same, Figure 1 is a perspective of the improved toaster, Fig. 2 is a vertical transverse sectional view through the same, Fig. 3 is a horizontal sectional view taken on line 3—3 of Fig. 2, Fig. 4 is an end view, the end plate being removed to illustrate the setting and timing mechanism, the parts being shown in the position they occupy prior to the movement of the bread to the toasting zone or compartment, Fig. 5 is an end view with the cover or end plate removed to illustrate the positions occupied by the parts while the bread is being toasted, Fig. 6 is a detail longitudinal sectional view taken on line 6—6 of Fig. 3, Fig. 7 is a detail sectional view taken on line 7—7 of Fig. 3, Fig. 8 is a diagram, Fig. 9 is a view of a regulator for controlling the toasting period.

In the drawings, wherein for the purpose of illustration is shown a preferred embodiment of the invention, the numeral 5 designates a casing having a front wall 6, end walls 7, a frontal table 8, and warming cabinet 9, the said cabinet being provided with a front door 10 by means of which the toast may be inserted and removed. However, the cabinet 9 is for warming purposes only and is provided with isin-glass panels 11 so that the contents of the cabinet may be viewed.

Attention is invited to Fig. 1 which illustrates that the frontal table 8 is provided with a plurality of slots or openings 12 by means of which the individual slices of bread may be mounted upon carriages 14.

It will be seen that the several bread supports 14 are mounted upon a carriage 15 having rollers 16 movable on a track 17. Fig. 2 illustrates the carriage 15 in its loading and unloading positions and it may be moved to the right in Fig. 2 to position the slices between a plurality of heating elements 18.

The carriage 15 may be moved to its loading or unloading position by cranks 20 connected to a cross rod 21 and having their lower portions pivoted as indicated at 22 to a pair of links 23. It will be seen that when the rod 21 is turned the cranks 20, of which there are two, are operated for moving the carriage 15 either to its loading or heating position. At this point it might be stated that each bread support is provided with upstanding sides consisting of wire 24 or other suitable means for holding the bread on edge.

Attention is directed to Fig. 4 which illustrates that the rod 21 has rigid connection with a carriage operating lever 26 and the carriage operating lever is provided with a branch 27 to which a coil spring 28 is connected. The coil spring 28 acts on the lever to urge the carriage to its loading and unloading position and when the lever 26 is moved in a counter-clockwise direction the carriage is moved to the bread toasting position. The lever 26 is swung in a counter-clockwise direction by a laterally projecting roller 29 on the upper end of an arm 30 pivotally supported at its lower end as indicated at 31. When the arm 30 is swung to the right the laterally projecting roller 29 will engage the lever 26 and thereby swing the same in a counter-clockwise direction for moving the bread to the toasting position.

The lever operating arm 30 is as illustrated in Fig. 5 engaged by a laterally projecting roller 33 of a weight lifting lever 34. When the weight lifting lever 34 is swung in a counter-clockwise direction the roller 33 on the same will engage the adjacent edge of the arm 30 and thereby swing the arm to the right for operating the carriage shifting lever 26. During the upward movement of the lever 34 the carriage operating lever 26 is swung over a spring actuated dog 37 slidable in a housing or casing 38.

The spring actuated dog 37 locks the carriage operating lever 26 in the position illustrated in Fig. 5 and owing to the irregular or cam-like edge of the arm 30 the roller 29 will move the lever 26 over the dog 37 before the lever 34 reaches the limit of its upward movement. A spring 39 connected to the arm 30 swings the arm 30 to the position illustrated in Fig. 5. To regulate the movement of the arm 30 the intermediate portion of the same is provided with a cam 40 having an adjusting screw 41 by means of which the position of the cam may be varied. The position of the cam 40 with relation to the roller 33 which engages the same controls the movement of the carriage with respect to the timing of the other parts.

The main setting lever is designated by the numeral 43 and is connected for swinging movement as indicated at 45 to an ear 46. The outer end of the lever 43 is provided with a handle which may be depressed to swing the inner end of the lever upwardly into engagement with the laterally projecting roller 33 so as to swing the lever 34 to the position illustrated in Fig. 5. It is thus seen that the roller 33 is not only engaged by the arm 30, but is also engaged by the upper edge of the main manually operated lever 43.

In the operation of the parts thus far described, the handle of the lever 43 is manually depressed for swinging the weight lifting lever 34 from the position illustrated in Fig. 4 to the position illustrated in Fig. 5 and the roller 33 will engage the cam-like edge of the arm 30 for swinging the roller 29 of the same into engagement with the carriage operating lever 26 and this will operate the cranks 20 for swinging the carriage to the position illustrated in full lines in Fig. 3 to the bread toasting position between the heating elements. When the carriage operating lever 26 is swung in a counter-clockwise direction it is held as illustrated in Fig. 5 in a set position by the spring actuated pawl 37 over which it travels during its movement to the position illustrated in Fig. 5.

Now, the upward movement of the lever 34 is accompanied by an upward movement of a link 50 connected to the end of the same and having its lower end portion provided with a notched projection for the reception of a pin 51 on the lower end of an ear 52 carried by a vertically movable weight 53. With reference to Fig. 4 it will be seen that the upward movement of the lever 34 will move the weight 53 upwardly so that a rack 55 on the forward edge of the same will be engaged with a pinion 56 on one end of a shaft 57. Fig. 7 illustrates that the shaft 57 forms a part of an escapement or timing mechanism arranged within a housing 3 and provided with a governor 59. The turning of the pinion 56 incident to the movement of the weight turns a wheel 60, the edge of which or the periphery of which is formed with teeth for engaging laterally projecting pins 61 on the governor shaft 62.

When the weight 53 has been moved to its uppermost position its descent is retarded by the timing and governing mechanisms.

However, when the weight 53 finally descends the pin 51 of the same will engage the releasing member 58 rigidly connected to the spring actuated pawl 37 and movable through a slot in the casing 38. This will cause the releasing member 58 to descend and release the spring actuated dog 37 from engagement with the carriage operating lever 26 so that the spring 28 may operate the carriage operating lever. When the spring 28 operates the lever 26 the carriage is moved from the bread toasting to the discharge position. Attention is directed to Fig. 4 which illustrates that the notched projection on the lower end of the link 50 is held in engagement with the pin 51 at all times by a spring 4 connected to a pin 2 on the upper end of the link and connected at its other end to the lever 34.

When the weight 53 is in its lower position as illustrated in Fig. 4 it engages the offset end of a switch operating lever 65 connected for swinging movement as indicated at 66 to a standard or support 67 and having one end connected to the carrier of a plurality of movable contacts 68. The contacts 68 of the carrier 69 are held in an elevated position when the carriage is in its loading and unloading position and consequently they are held out of engagement with the relatively fixed contacts 70. This breaks the circuit and consequently the heating elements 72 are energized only during that time when the bread is in toasting position. When the weight 53 is elevated by the means previously described a spring 74 connected to the lever 65 swings the lever upwardly so as to complete the circuit through the heating elements. When the weight 53 descends it engages the offset end of the switch operating lever 65 and breaks the circuit by separating the contacts 68 and 70, the specific construction of which forms no part of this invention.

It might be stated that the movable carrier 69 is provided with a pair of guides 75 having sliding connection with rods or other guide members 76 mounted within the casing.

The wiring diagram is illustrated in Fig. 8 and it will be seen that each heating element is provided with a separate switch 80 having a control member 81 arranged exteriorly of the casing and forming means whereby any number of heating elements may be energized when the bread is moved to toasting position. One line of the source of current is connected to the upper series of contacts 84 and the other lines are connected to the contacts of the switch so that any number of heating elements may be cut out when desired.

The extent to which the weight lifting lever 34 may be elevated is regulated by a stop pin 90 on the lower end of a rack 91 and the rack is engaged with a gear 92 on the end of a shaft 93. The gear 92 has connection with a wing nut 94, the stem of which is movable through an arcuate slot 95 in a dial 96 in the front wall of the casing. The pin 90 is in the path of travel of the lever 34 and limits the upward movement of the same. Therefore, it will be seen that by varying the position of the pin 90 the extent to which the lever 34 may be moved upwardly may be varied. When the pin 90 has been properly positioned the wing nut 94 is tightened so that the pin is held in a set position.

Should it be desired to instantly stop the machine it is merely necessary to push inwardly on the knob 100 on one end of a link 101, the inner end of the link having connection with a releasing member 102 having connection as illustrated in Fig. 3 with the pinion 56 which engages the rack on the weight. By thus releasing the pinion 56 from engagement with the rack 55 the weight is allowed to instantly drop and stop the machine. When the machine is stopped the circuit through the heating elements is broken and the bread is moved to its discharge position.

In carrying out the invention a tray 105 is slidable in the lower portion of the machine beneath the several heating elements and receives crumbs which drop from the bread and it will be seen that the lower edges of the bread supports are V-shaped in cross-section as indicated at 106 so that any crumbs which drop on the same will slide off freely and into the tray.

Having thus described the invention, what is claimed is:

1. A bread toasting machine comprising a casing, a horizontally movable carriage slidable within said casing, a carriage operating lever having connection with the carriage, and a manually operated lever associated with said first named lever and having means for swinging the carriage operating lever to operating position.

2. A bread toasting machine comprising a casing, a horizontally movable carriage slidable within said casing, a carriage operating lever having connection with the carriage, a manually operated lever associated with said first named lever and having means for swinging the carriage operating lever to operating position, and means whereby to hold the carriage operating lever in a set position.

3. A toaster comprising a horizontally movable carriage, links connected to the ends of the carriage, an operating shaft having cranks connected to the links to simultaneously operate the same, a main lever connected to the shaft, and an arm having means to engage said lever to swing the same to operative position.

4. A toaster comprising a horizontally movable carriage, links connected to the carriage, an operating shaft having cranks connected to the links to simultaneously operate the same, a main lever connected to the shaft, an arm having means to engage said lever to swing the same to operative position, and a spring actuated dog for holding the lever in a set position.

5. A toaster comprising a horizontally movable carriage, links connected to the carriage, an operating shaft having separate cranks connected to the links to simultaneously operate the same, a main lever connected to the shaft, an arm having means to engage said lever to swing the same to operative position, a spring actuated dog for holding the lever in a set position, and weight operated means for releasing the dog from engagement with said lever.

6. A toaster comprising a carriage, means for movably supporting the carriage, a carriage operating lever having connection with the carriage, a spring actuated dog for engaging the lever to hold the same in a set position, a pivoted arm having means to swing said lever to operative position, a second lever having means engaging said arm to swing the arm into engagement with said first-named lever, said arm being provided with a cam surface for engagement by said second-named lever, and a manually controlled operating member having connection with said second-named lever.

7. A machine of the character specified comprising a carriage, an operating lever having connection with the carriage, means to hold the lever in a set position, a spring actuated arm having a roller to engage said lever to swing the same to operative position, a second lever having a roller to engage said spring actuated arm, and a manually operative setting member engaging said roller and adapted for swinging the second-named lever to operative position.

8. A machine of the character specified comprising a carriage, an operating lever having connection with the carriage, means to hold the lever in a set position, a spring actuated arm having a roller to engage said lever to swing the same to operative position, a second lever having a roller to engage said spring actuated arm, a manually operative setting member engaging said roller and adapted for swinging the second-named lever to operative position, a timing weight, and means connected to said second-named lever for operating said weight.

9. A machine of the character specified comprising a carriage, an operating lever having connection with the carriage, means to hold the lever in a set position, a spring actuated arm having a roller to engage said lever to swing the same to operative position, a second lever having a roller to engage said spring actuated arm, a manually operative setting member engaging said roller and adapted for swinging the second-named lever to operative position, a timing weight, and means connected to said second-named lever for operating said weight, said weight being provided with means to release said first-named lever.

10. A machine of the character specified comprising a carriage, an operating lever having connection with the carriage, means to hold the lever in a set position, a spring actuated arm having a roller to engage said lever to swing the same to operative position, a second lever having a roller to engage said spring actuated arm, a manually operative setting member engaging said roller and adapted for swinging the second-named lever to operative position, a timing weight, means connected to said second-named lever for operating said weight, said weight being provided with means to release said first-named lever, and a timing mechanism operated by said weight.

11. A machine of the character specified comprising a carriage, an operating lever having connection with the carriage, means to hold the lever in a set position, a spring actuated arm having a roller to engage said lever to swing the same to operative position, a second lever having a roller to engage said spring actuated arm, a manually operative setting member engaging said roller and adapted for swinging the second-named lever to operative position, a timing weight, means connected to said second-named lever for operating said weight, said weight being provided with means to release said first-named lever, a timing mechanism operated by said weight, and adjustable means to limit the upward movement of the weight.

12. A machine of the character specified comprising a carriage, an operating lever having connection with the carriage, means to hold the lever in a set position, a spring actuated arm having a roller to engage said lever to swing the same to operative position, a second lever having a roller to engage said spring actuated arm, a manually operative setting member engaging said roller and adapted for swinging the second-named lever to operative position, a timing weight, means connected to said second-named lever for operating said weight, said weight being provided with means to release said first-named lever, a timing mechanism operated by said weight, adjustable means to limit the upward movement of the weight, and a switch operated by said weight.

13. A machine of the character specified comprising a carriage, an operating lever having connection with the carriage, means to hold the lever in a set position, a spring actuated arm having a roller to engage said lever to swing the same to operative position, a second lever having a roller to engage said spring actuated arm, a manually operative setting member engaging said roller and adapted for swinging the second-named lever to operative position, a timing weight, means connected to said second-named lever for operating said weight, said weight being provided with means to release said first-named lever, a timing mechanism operated by said weight, adjustable means to limit the upward movement of the weight, a switch operated by said weight, and a plurality of heating elements having connection with said switch.

14. A toaster comprising a switch controlling lever, a weight adapted to engage the lever to hold the same in inoperative position, said weight being provided with a rack, a governor mechanism having a pinion engaged with said rack to retard the descent of the weight, and a setting lever having connection with the weight.

15. A toaster comprising a switch controlling lever, a weight adapted to engage the lever to hold the same in inoperative position, said weight being provided with a rack, a governor mechanism having a pinion engaged with said rack to retard the descent of the weight, a setting lever having connection with the weight, and a carriage operated by said setting lever.

16. A toaster comprising a carriage for supporting a plurality of slices of bread, means for operating the carriage, a timing weight having a rack, a timing mechanism having a pinion engaging the rack, and a releasing member having means to release the pinion from the rack whereby to allow the weight to instantly move out of engagement with the timing mechanism.

In testimony whereof we affix our signatures.

FREDERICK E. HUMMEL.
JOHN J. NOETH.